United States Patent [19]

Kilty et al.

[11] 4,230,573

[45] Oct. 28, 1980

[54] CARTRIDGE FILTER AND METHOD OF MAKING SAME

[75] Inventors: Michael Kilty, Windsor Locks; Allan Pernigotti, Enfield, both of CT

[73] Assignee: AMF Incorporated, White Plains, N.Y.

[21] Appl. No.: 46,743

[22] Filed: Jun. 8, 1979

[51] Int. Cl.³ ............................................. B01D 39/16
[52] U.S. Cl. .............................. 210/767; 55/DIG. 5; 55/524; 210/490; 210/506; 427/411
[58] Field of Search .............. 210/387, 490, 494 R, 210/506, 65; 55/DIG. 5, 524; 427/322, 411, 407 R

[56] References Cited

U.S. PATENT DOCUMENTS

| | | | |
|---|---|---|---|
| 3,100,721 | 8/1963 | Holden | 55/DIG. 5 |
| 3,238,056 | 3/1966 | Pall et al. | 210/506 X |
| 3,246,767 | 4/1966 | Pall et al. | 210/506 X |
| 3,585,107 | 1/1971 | Williams | 162/387 |
| 3,648,846 | 3/1972 | Sicard | 210/494 |
| 3,937,860 | 2/1976 | Gusman | 210/506 X |
| 4,007,113 | 2/1977 | Ostreicher | 210/23 R |
| 4,052,316 | 10/1977 | Berger, Jr. | 210/490 X |

*Primary Examiner*—John Adee
*Attorney, Agent, or Firm*—George W. Price; Charles J. Worth

[57] ABSTRACT

Cartridge filters of enhanced capture potential for fine contaminants, prepared by selective interaction of melamine formaldehyde bonding resin and polyamido/polyamine-epichlorhydrin charge modifier.

18 Claims, 1 Drawing Figure

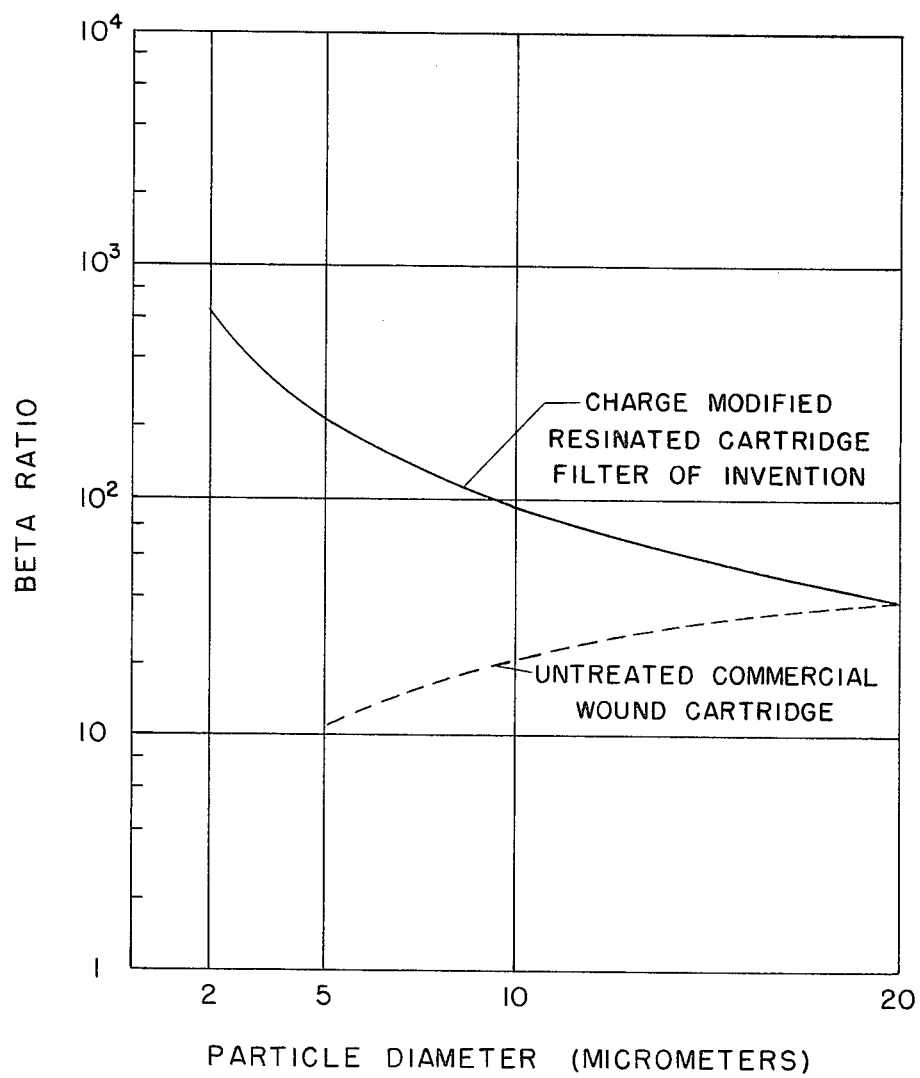

CARTRIDGE FILTER AND METHOD OF MAKING SAME

This invention relates to cartridge filters, their preparation and use in the filtration of liquids, especially aqueous systems contaminated with fine contaminants.

Depth filtration type cartridge filters in the form of relatively rigid self-supporting thick walled porous tubular elements composed of resin-impregnated fibrous material are well-known. These filters are commonly used in industry for heavy duty filtration of liquids for the removal of medium to coarse contaminants as they are characterized by relatively high flow and long life even at relatively high contamination levels.

The cartridges function by mechanical straining through pores of relatively large dimension. In mechanical straining a particle is removed by physical entrapment when it attempts to pass through a pore smaller than itself. It is therefore necessary in such cases that the pore size of the filter medium be smaller than the particle size of the contaminant to be removed from the fluid. For removal of fine, submicronic contaminant particles by mechanical straining, the filter media need have correspondingly fine pores. Since the pore size of such a structure is determined predominantly by the size and morphology of the materials employed in its construction, in thin filter sheet media component materials of small size, such as small diameter fibers may be employed for enforcement of fine filtration. (See Pall U.S. Pat. Nos. 3,158,532; 3,238,056; 3,246,767; 3,353,682 or 3,573,158).

While somewhat smaller pores can be formed in cartridge filters by control of fiber diameter or degree of fibrillation, the thick wall structure of the depth filtration type cartridge filters imposes practical limits to the fineness of pore size producible in these filters, as related to the ability to vacuum form the fibrous batt and dry the structure, particularly at sensible energy levels. Moreover, reduction in pore dimension impacts unfavorably upon flow rate and useful life in such structures.

As a consequence of these limitations, filtration efficiency of cartridge filters for wide spectrum medium to coarse contaminants rarely exceeds 75-80% on a commercial basis. Wound filter cartridges, on the other hand, may be constructed to provide up to 95% efficiency on the same basis, but are more expensive to product and hence employ on a wide scale.

It is known in filter sheet construction to provide electrokinetic particle capture characteristics and hence improved filtration efficiency, by surface charge modification utilizing a cationic resin, such as the cationic colloidal melamine-formaldehyde resin of U.S. Pat. Nos. 4,007,113-4,007,114; or the polyamido/polyamine-epichlorhydrin cationic resin of copending and commonly assigned Appln. Ser. No. 013,716 of Hou, et al. filed Feb. 21, 1979 both incorporated by reference herein. However, structural rigidity requirements of cartridge filters (leading, for example to the use of on the order of 35% bonding resin by weight), in conjunction with other features of their construction, preparation, processing and use render enhancement of their filtration characteristics by these methods difficult.

The cationic colloidal melamine-formaldehyde resin is of low molecular weight and is accordingly limited in respect of the amount of charge modification that can be achieved in its use, contraindicating this resin for substantial modification of a generally large pore structure. In any event, the melamine-formaldehyde cationic colloid cannot be successfully applied to the cartridges, especially at adequate levels to provide sufficient bonding of the cartridge filters, due to the high dilutions required for these relatively dense structures, and the limited dispersion stability range of the acid colloid.

The polyamido/polyamine-epichlorhydrin cationic resin on the other hand, when employed as a binder in a cartridge filter construction, is incapable of providing adequate structural rigidity characteristics, even at comparably high resin loadings. While this resin may nonetheless be supplied to the system as a cationic charge modifier surface coated over another binder such as the typically used phenolic (see U.S. Pat. No. 3,585,107), the electrokinetic potential induced is short-lived as the cationic resin is readily removed from the system by flushing.

Accordingly, it is an object of the invention to provide a cationically modified cartridge filter construction.

It is a further object to prepare a charge modified cartridge filter of suitable structural characteristics.

Another object is the provision of a cartridge filter effective in the removal of fine contaminants including submicron electronegatively charged constituents, having an extended useful life.

BRIEF DESCRIPTION OF THE INVENTION

It has now been discovered in accordance with the present invention that cartridge filters of modified electrokinetic properties having suitable structural characteristics and extended useful lives may be prepared by the conjunctive use of a melamine-formaldehyde resin bonding agent and a polyamido/polyamine-epichlorhydrin charge modifier.

The cartridge itself is formed in conventional manner by vacuum forming a fiber-bearing, usually cellulose slurry into a tubular element which is impregnated with the bonding agent, dried and cured. The bonded element is again impregnated with the charge modifying polyamido/polyamine-epichlorhydrin cationic resin and dried and cured, preferably under selected conditions discussed hereinafter, to provide a cartridge filter having enhanced turbidimetric efficiency competitive with wound filter constructions while retaining the relatively large pores associated with high flow and long useful life. The improved filtration efficiency is attributable to the enhanced capture potential for fine particulates, especially contaminants exhibiting an anionic charge under the filtration conditions.

BRIEF DESCRIPTION OF THE DRAWING

The FIGURE is a graphical representation of the competitive performance of a charge modified resinated cartridge filter in the untreated commercial filtration of an aqueous system contaminated with fine test dust.

DETALED DESCRIPTION OF THE INVENTION

The cartridges may be formed in general in accordance with available technology, for example as disclosed in any of U.S. Pat. Nos. 3,442,757; 3,585,107; 3,594,273; 3,619,353; and 3,648,846. Preferably, the fibers are interfelted in a method utilizing a foraminous former upon which a fiber bearing slurry is accreted or felted to a controlled density and dimension, as a figure of revolution thereabout. The vacuum felted generally tubular element or preform is then treated as by impregnation with the bonding agent, dried and cured.

These cartridges typically comprise 60–65% of fiber, commonly cellulose-based such as wood pulp, cotton linters, rayon, or cellulose acetate which may be admixed with a minor proportion of synthetic fiber or glass microfiber, any of which may be derived from recycled waste. While the fiber may be of any practical dimension for slurrying and vacuum forming, finer dimensioned material is preferred. The fiber slurry may also contain a proportion of particulate material such as perlite or diatomaceous earth, but usually comprises only fibrous material.

The usual commercial filter is a thick walled tube in the form of a right circular cylinder formed with a 9.75 inch length, 2.62 inch outside diameter, and a central, longitudinally extending 1 inch diameter aperture communicating with both end faces. The filter may be constructed with a plurality of axially spaced grooves or indented cuts in the outer surface, having for example a trapezoidal or rectangular section, for example about 5/16 inch in depth, to provide increased surface area and extended life. Other profilings of the surface may of course be employed to like effect. The cartridge is employed in a housing of conventional design and may, but need not be provided with a rigid support structure. The inlet flow from the top of the housing is distributed along the exterior of the normally vertically disposed cartridge and filtration is effected by axial flow under pump pressure from the exterior to the interior, thence to outlet flow through the bottom of the housing. In the case of ungrooved cartridges, then, the depth of the bed along the axial flow is about 1.6 inch and for grooved cartridges about 0.5–0.6 inch.

The fibrous material is bound into a integral at least semi-rigid self-supportive porous structure with a selected bonding resin, a melamine-formaldehyde resin.

Melamine-formaldehyde resins are well-known (see e.g., Chapter 2, Melamine-Formaldehyde, C.S. Maxwell, *Wet Strength in Paper and Paper Board,* Tappi Monograph Series No. 29, 1965 and Amino Resins, John J. Blair, pp. 19–25, Reinhold Publishing Corp. New York 1959), and these resins have commonly been used in the paper industry to impart water resistance, i.e., wet strength, as shown in U.S. Pat. No. 2,563,897. The compounds generally designated melamine-formaldehyde are reaction products of formaldehyde with methylol melamine monomers in which there are from 1 to 6 methylol substituents, the most commonly use being the di or trimethylol compounds, preferably the latter. Such water soluble resins are well-known and are commercially available as Cymel 401 or (non-colloidal) Cymel 409 (American Cyanamid). The reaction products may be alkylated to convert the free hydroxyl groups to —OR groups, and such reaction products are preferred for convenience of storage and handling use alkylated. Although R may be methyl, ethyl, propyl and the like having up to 5 carbon atoms, the methyl derivative is preferred. Suitable such resins are likewise commercially available as R Diaron 27-013 (Reichhold) Resimene RS-7367 (Monsanto) and, preferably Cymel 481 (American Cyanamid). The water soluble resins are commonly supplied as an aqueous solution comprising 75–80 percent solids. In use, this solution is conveniently diluted to 35% solids; and impregnation is facilitated by drawing a vacuum through the central aperture of the tubular element.

Although a relative degree of bonding may be achieved by different levels of application, the requirement for structural rigidity in cartridge filters generally dictates the use of at least 30 percent by weight (solids) of bonding resin, up to 40 percent or more. Following impregnation, the excess resin is removed by suckout and the cartridge is dried and cured in conventional manner, as by blowing hot air through an arbor emplaced in the central aperture. The drying and curing of the structure stabilizes and fixes the geometric orientation of the interfelted fibrous material by interbonding, and hence establishes in the interstices therebetween the permanent pore dimensions and thus flow rate of the structure. Typically, such structures exhibit water flow rates of 5 to 12 gallons per minute (gpm) at 2 psid.

Although the use of the melamine-formaldehyde resin has been found necessary to achieve a coactive interbonding of the selected charge modifier to the substrate, it will be understood that admixtures with other bonding agents may be employed in some cases with adequate performance.

The dried bonded tubular filter element is then treated with a specified cationic resin to modify the surface charge of the bonded fibrous material to enhance filtration efficiency.

Suitable polyamido/polyamine-epichlorhydrin cationic resins are those of U.S. Pat. Nos. 2,926,116; 2,926,154; 3,224,986; 3,332,901 and 3,382,096 incorporated herein by reference and may be produced by reacting a dicarboxylic acid with a polyamine dimer to form a water soluble polymer which is further reacted with epichlorhydrin. The dimer unit may have the general formula:

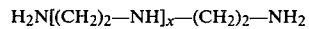

$$H_2N[(CH_2)_2-NH]_x-(CH_2)_2-NH_2$$

where x is an integer of 1 to 7, and the dicarboxylic acid may be aromatic or aliphatic such as adipic, azelaic, diglycolic, oxalic or malonic acids. The cationic charge is induced through the amine function in tertiary or quaternized configuration. Other suitable charge modifying resins, employing a hertocyclic dicarboxylic acid reactant are disclosed in U.S. Pat. No. 3,761,350. The polyamido/polyamine-epichlorhydrin cationic resins are avalable commercially, as Polycup 1884, 2002 or S2064 (Hercules); Cascamide Resin pR-420 (Bordon); or Nopcobond 35 (Nopco).

The cationic resin is provided to modify the surface charge of the filter element structure by the deposition of sufficient charge modifier to render the surface electropositive, providing at least certain electropositive regions or sites within the filter structure. It is believed that these regions or sites are responsible for the enhanced filtration efficiency achieved, although it is surprising to find electrokinetic effects controlling given the relatively large pore structure involved, and may suggest selective site modification.

The charge modifying PAE resin may be employed to directly impregnate and surface treat either the semi-finished or ground and cut or grooved cartridge. Although coating efficiencies and performance in some cases favor the latter, production ease and economy normally calls for the impregnation of the semi-finished or uncut cartridge even where a profiling step is to be performed later in the manufacturing sequence.

In general, the amount of charge modifier employed is that sufficient to enhance the filtration efficiency of the unmodified melamine-formaldehyde bonded cartridge filter. It has been found that an amount of PAE charge modifier of 1 to 3, preferably 2.0–2.5% (dry basis) by weight is sufficient for most applications, by application from a 1.5% solution with 100-125% wet pickup. Preferably, the pH of the modifying solution is adjusted to below about 6.3, preferably 6.0 to 6.2 to maximize filtration efficiency.

Representative grooved cartridge filters prepared in accordance with the invention exhibit turbidimetric efficiencies of about 88-92% (3 gallons per minute water flow; contaminant AC coarse dust at about 32 FTU, Hach), as compared to about 55-60% for the standard unmodified resinated cartridge (G78B2, available from AMF Cuno Division). Generally gram life values (the grams of contaminant dust held by the cartridge upon filtration of contaminated fluid to 20 psid) for the inventive cartridges ranges from 75 to 80.

It has been found that the use of polyamido/polyamine formaldehyde cationic resin in connection with cartridge filters bonded with alkylated melamine-formaldehyde resins requires a drying and curing temperature for the cationic resin of at least 300° F. While this result is entirely unexpected, and applicants do not wish to be bound by an essentially hypothetical elucidation, it is believed that the critical effect of temperature is interrelated with the interbonding of the PAE resin into the matrix at least in part by way of interreaction with residual functional groups associated with the bonding resin. This thesis is consistent with the extension of useful life for electrokinetic filtration, suggesting at least some covalent bonding into the matrix at selected sites. The pH effect likewise may be explicable as related to the efficiency of the interbonding with the matrix or bonding resin.

In any event, the temperature of drying and curing of the cationic resin in accordance with the invention is controlled to provide an applied temperature (usually, drying air) of at least 300° F., preferably 310°-320° F. up to the decomposition or scorch point for the system and consistent with energy considerations. Typically, the cartridges will be dried in large quantities, e.g., 400 or more, and under such conditions nearly one to three hours may be required to attain bone dryness, although lower temperatures for longer periods and higher temperatures for shorter term treatments may be suitably employed.

Surprisingly, the drying and curing temperature is not the only significant variable in providing the preferred structures according to the invention. It is also desirable to employ techniques of static (oven) drying in the case of cartridge structures, to insure a uniform or relatively homogeneous effective distribution of cationically modified sites. Impregnated cartridge filters are typically dried utilizing sparged heated air supplied from within the central aperture, or convection drying along the exterior profile. The use of this now conventional technique on the filters of the invention results, however, in cartridges having a relatively restricted and ineffective charge modified surface, in that it is found that the modifying resin tends to migrate and accumulate toward the source of drying heat, or the interior or exterior surface of the cartridges. Thus to provide a relatively homogeneous distribution of charge modified sites, it is desirable to employ static drying under the aforementioned temperature constraints. The invention of course contemplates a profiled distribution of charge modifier where desired.

PERFORMANCE TESTING

1. Filtration Efficiency

In this test, contaminated fluid of a specified turbidity (normally 30-35 FTU for coarse contaminant and 70-75 FTU for fine contaminant is pumped through the cartridge at a specified flow rate (usually 1-3 gpm), effluent turbidity measured (using a Hach model 2100A Turbidimeter) generally over the first 5-6 minutes of filtration, and expressed as percent filtration (turbidimetric) efficiency when compared to the inlet turbidity, calculated as Efficiency=Turbidity In—Turbidity Out Turbidity In Usually, the inlet and outlet turbidity values are averaged; and on occasion the final turbidity (effluent) value is employed, (at the point when the differential pressure across the cartridge exceeds 20 psid, the conclusion of the test). The performance of the filter may also be seen by examination of the change in effluent turbidity values with time, and the elapsed time to conclusion of the test at 20 psid. The contaminant is natural Arizona road dust (supplied by AC Spark Plug Division of General Motors Corp.) having a relatively wide spectrum of particles, classified (by the G.M. Phoenix Laboratory) as follows:

|  | Coarse | Fine |
| --- | --- | --- |
| 0 to 5 microns | 12 ± 2% | 39 ± 2% |
| 5 to 10 microns | 12 ± 3% | 18 ± 3% |
| 10 to 20 microns | 14 ± 3% | 16 ± 3% |
| 20 to 40 microns | 23 ± 3% | 18 ± 3% |
| 40 to 80 microns | 30 ± 3% | 9 ± 3% |
| 80 to 200 microns | 9 ± 3% | — |

2. Gram-Life

In the same manner, the performance of the filter may be expressed as the grams of contaminant retained by the filter upon the conclusion of the test at 20 psid.

3. Beta Test

In this test the cartridge filter is challenged with test contaminant (AC Fine) under test conditions of 10 NTU contaminant (inlet) at 1.5 gpm, utilizing a wide spectrum contaminant, the contaminant population classified at inlet, and outlet terms of cumulative particle size diameter expressed in microns using a Hiac particle counter with a 100 micron orifice sensor, and results recorded to filter midlife (half of the lifetime to test termination at 20 psid). These results are calculated and expressed as the ratio (Beta ratio) of particles larger than a certain dimension relative to particles less than a certain dimension, and plotted as the Beta ratio for the respective particle size balances against particle size, evidencing the relative capture efficiency of the filter structure against certain particle size contaminants.

Other characteristics, e.g., of chemical, water and solvent resistance are commonly tested and reported but are conventional for these structures and in industry usage.

4. Structural Characteristics

While no specific test is set forth, structural requirements for cartridge filters include those necessary to their usual handling and use, including a rigidity sufficient to permit grinding and cutting into the grooved or profiled form commonly in use, but without excessive brittleness to avoid fracture; and the property of being self-supporting without a core during the filtration cycle.

Other characteristics, e.g., of chemical, water and solvent resistance are commonly tested and reported but are conventional for these structures and in industry usage.

COMPARATIVE EXAMPLE A

A cartridge filter (9.75" L×2.62" OD×1.0" I.D.; about 130-140 g interfelted fibers comprising cellulose linters and 7.5% by weight of glass microfibers) was prepared in conventional manner, including impregnation with phenolic bonding resin to about 35 percent of the bone dry weight. The cartridge was dried and cured, and grooved.

Turbidimetric filtration efficiency was determined for this cartridge, and the results compared to a control cartridge without surface charge modification utilizing AC Fine Dust contaminant (33.3 grams/10 liters supplied in water at 1 gallon/minute: an average 69 FTU, Hach). In five minutes, effluent turbidity was 8.4 FTU at 5.5 psid, but deteriorated rapidly, reaching 12.0 FTU at 8 minutes and 18 by 18 minutes. Filtration efficiency (final turbidity) of 73.9% was improved as compared to the control cartridges (efficiency about 55-60%) under the test conditions but was progressively worsening.

COMPARATIVE EXAMPLE B

In a similar manner to Comparative Example A, an ungrooved cartridge filter was prepared, utilizing a polystyrene binder and surface treated with 2% (dry weight) of Hercules Polycup 1884 cationic resin. Effluent turbidity had reached only 3.0 FTU at 20 psid (8 minutes), but increased to 24 FTU at 37 minutes, for an efficiency (final turbidity) of 66.7%. Similarly to Comparative Example A, although some improvement could be seen over the control, the effect was rapidly lost, and was attributed to insufficient retention of the charge modifying resin in the filter structure.

EXAMPLE 1

A. A cartridge filter (9.75" L×2.62" O.D.×1.0" I.D.; about 130-140 g interfelted fibers comprising cellulose linters and 7.5% by weight of glass microfibers) was prepared in conventional manner including impregnation with methylated melamine formaldehyde bonding resin (Cymel 481, American Cyanamid) to about 35 percent of the bone dry weight. The dried and cured tubular element was grooved and tested. The control filter, challenged at a flow rate of 3 gallons per minute (AC Dust fine, to provide inlet turbidity of 76-78 FTU) evidenced a filtration efficiency of 57.7%.

B. A filter of the same construction was then treated by impregnation with 2% (dry weight) of a cationic polyamido/polyamine-epichlorhydrin resin (Hercules Polycup 1884: about 100,000 mol. wgt.; about 150Å particle size; solution pH 6.0 at 1.5% solids). The treated filter was dried in a static oven at 310°-330° F. and tested. The filtration efficiency was 93.5% at a water flow of 3 gallons per minute (inlet turbidity 71-78 FTU, AC dust fine) and gram-life was 82.5. A replicate (inlet turbidity range 65-78) tested at 94.2%; and a third sample (1884 solution at pH 6.1) at an inlet turbidity range of 77-78 FTU attained an efficiency rating of 98.1% (effluent turbidity 1.3 at 20 psid).

C. A second series of cartridge filters were prepared in accordance with the invention and in the same manner, except that the cartridge constuction was 100% cotton linters. The control evidenced a filtration efficiency of 64.2% (AC Dust coarse, 31-33 FTU flow rate 3 gpm); whereas the replicated inventive filters (ungrooved) exhibited filtration efficiencies of 95.4 and 96.1%, respectively: AC Dust, coarse; 32-35 FTU; equivalent flow rate).

The results of these runs (in each case including the melamine-formaldehyde bonding resin) is set forth in Table I, as follows:

TABLE I

| Cartridge Filter | Contaminant | Filtration (Turbidimetric) Efficiency, & |
|---|---|---|
| Control, Cotton Linters, glass | Fine | 57.7 |
| PAE Treated, Cotton Linter/glass | Fine | 93.5; 94,21 98.1 |
| Control, Cotton Linters | Coarse | 64.2 |
| PAE Treated, Cotton Linters | Coarse | 95.4, 96.1 |

EXAMPLE II

Cartridge filters were prepared in the same manner as Example 1B, (except ungrooved) in runs utilizing varying pH of the cationic resin treating solution, and drying times (all static oven, 310°-330° F. drying air) with the results, reflected in filtration efficiencies (AC Dust, fine at 32 FTU, average inlet turbidity), set forth in the following Table:

TABLE II

| Run # | pH, 1884 Solu. | Drying time, min. | Filtration Efficiency % |
|---|---|---|---|
| 1 | 6.45 | 55 | 86.3 |
| 2 | 6.45 | 65-70 | below 80. |
| 3 | 6.1 | 52 | 88 |
| 4 | 6.1 | 58 | 92.2 |

EXAMPLE III

An ungrooved cartridge filter was prepared in accordance with Example IB, except that drying and curing was effected at 250° F. The cartridge exhibited only a 65% efficiency under the test conditions and performance worsened, drifting to a 33% (final turbidity) efficiency rating. It was concluded that the resin was insufficiently interbonded into the structure.

EXAMPLE IV

A cartridge filter was felted from a 50/50 admixture by weight of soft cotton fiber and perlite treaed with 0.25% Hercules Polycup 1884 cationic resin, bonded with methylated melamine-formaldehyde resin, dried, cured, impregnated with Hercules Polycup 1884 resin (1.5%) dried and cured in standard manner. This structure exhibited a filtration efficiency on AC dust, fine of better than 99% hence another sample was challenged with Hyplar contaminant (a polydisperse acrylic latex produced by emulsion polymerization and comprising colloidal polymer paticles ranging from 0.05 to 1.0 micron) at a flow rate of 1 gal. per minute, 20 FTU. Filtration efficiency ranges from 75-80%, over a ten minute period.

EXAMPLE V

A charge modified resinated cartridge filter construction was prepared as in Example IB, and compared in performance to a competitive untreated wound cartridge of comparable flow rate using the Beta test.

Thus, the respective cartridges were supplied with contaminated aqueous medium (Arizona test Dust, Fine; 10 NTU) at 1.5 gallons/minute, and inlet and outlet monitored by a Hiac particle counter (sensor) to analyze the contaminant population. The amount of contaminant particles sensed is expressed as the ratio of those above/below a certain particle size, and the ratio for varying particle size ratios plotted against particle size.

FIG. 1 represents the results of this Example, to the midlife point, comparing the filter of the invention with a commercially available wound (untreated) filter construction (cotton, 39 wind produced by Commercial Filters, a unit of Carborandum). The improvement in filtration efficiency for the filter of the invention in the lower particle sizes is drammatic. Thus, at a $B_5$ ratio (5 micrometer ratio) the filtration (turbidimetric) efficiency of the invention is about 99.5% as compared to about 90% for the control.

We claim:

1. A cartridge filter comprising an integral at least semi-rigid self-supporting porous thick-walled tubular element consisting essentially of fibrous material bonded with a melamine-formaldehyde resin, the surfaces of the bonded fibrous material being modified with a polyamido/polyamine-epichlorhydrin cationic resin.

2. The cartridge filter of claim 1, wherein said melamine-formaldehyde resin is alkylated.

3. The cartridge filter of claim 1, wherein the weight ratio of fibrous material to binder resin is from about 7:3 to about 3:2.

4. The cartridge filter of claim 1, comprising an amount of polyamido/polyamine-epichlorhydrin resin sufficient to enhance the filtration efficiency of the bonded fibrous structure.

5. The cartridge filter of claim 1, comprising from about 1 to about 3 percent by weight of a polyamido/polyamine-epichlorhydrin cationic resin.

6. The cartridge filter of claim 1, further comprising a particulate filter aid.

7. A method for the treatment of bonded cartridge filters comprising impregnating a dry preformed at least semi-rigid self-supporting thick-walled tubular filter element comprising fibrous material bonded into an integral porous structure with a melamine-formaldehyde resin with an aqueous solution of a polyamido/polyamine-epichlorhydrin cationic resin to provide a surface coating on the bonded fibrous surfaces sufficient to enhance filtration efficiency, and drying and curing the impregnated structure at a temperature of at least about 300° F.

8. The method of claim 7, wherein said melamine-formaldehyde resin is alkylated.

9. The method of claim 7 wherein the pH of the cationic resin solution is below about 6.3.

10. The method of claim 7 wherein from about 1 to 3 weight percent (dry basis) of said polyamido/polyamine-epichlorhydrin resin is incorporated into the bonded fibrous structure.

11. A method for the preparation of cartridge filters comprising bonding a fibrous structure into an at least semi-rigid self-supporting porous thick-walled tubular element with a melamine-formaldehyde resin, treating the surfaces of the bonded interfelted fibrous structure with a polyamido/polyamine-epichlorhydrin resin, and drying and curing the treated structure at a temperature of at least about 300° F. to remove essentially all water.

12. The method of claim 11, wherein the melamine-formaldehyde resin is alkylated.

13. The method of claim 11, wherein the drying is conducted at about 310°–330° F.

14. The method of claim 11 wherein the amount of polyamido/polyamine-epichlorhydrin resin is sufficient to enhance filtration efficiency of the bonded fibrous structure.

15. The method of claim 11 wherein the amount of polyamido/polyamine-epichlorhydrin resin is from about 1 to 3% by weight of the bonded fibrous structure.

16. The method of claim 11 wherein said drying is carried out in a static (oven) atmosphere.

17. The method of claim 11 wherein said polyamido/polyamine-epichlorhydrin cationic resin is applied as an aqueous solution having a pH of below about 6.3.

18. A method for the filtration of aqueous liquids at high flow rates and improved efficiency comprising passing said liquids through the cartridge filter of claim 1.

* * * * *